(No Model.)

C. D. LOCKHEAD.
FISHING HOOK.

No. 373,991. Patented Nov. 29, 1887.

Witnesses.
H. Ruppert
Daniel Scott

Inventor:
Charles D. Lockhead
Per
Thomas P. Simpson
Atty.

UNITED STATES PATENT OFFICE.

CHARLES D. LOCKHEAD, OF MIDDLETOWN, NEW YORK.

FISHING-HOOK.

SPECIFICATION forming part of Letters Patent No. 373,991, dated November 29, 1887.

Application filed August 11, 1887. Serial No. 246,711. (No model.)

*To all whom it may concern:*

Be it known that I, CHARLES D. LOCKHEAD, a citizen of the United States, residing at Middletown, in the county of Orange and State of New York, have invented certain new and useful Improvements in Fishing-Hooks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a spring-grapple wherein the two hooks shall interlap until the fish takes hold of the bait on one of them, and then shall spring apart, fastening the fish on opposite sides, so that he cannot possibly escape.

Figure 1:
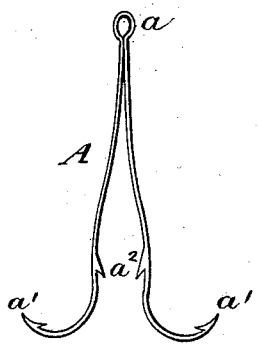
Figure 2:
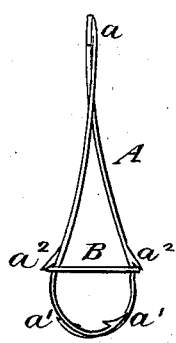
Figure 3:
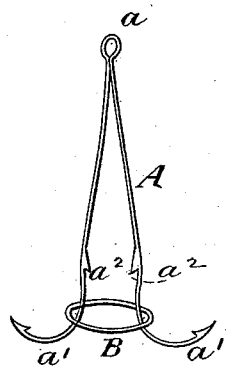

Figure 1 of the drawings is a perspective view of the spring-grapple without the setting-ring; Fig. 2, a side elevation showing the ring set to close the hooks together, side by side; Fig. 3, a similar view showing the hooks sprung apart and the ring down and loose.

In the drawings, A represents a spring-wire folded in the middle to form a loop, $a$, to which the fishing line is fastened. The ends are bent around opposite to each other to form the hooks $a'$ $a'$, which may or may not be bearded.

$a^2$ $a^2$ are two downward projections, one on the back of each hook at an oblique angle to the body of the hook.

B is a ring, which is ordinarily supported on the hooks, as shown in Fig. 3 of the drawings; but by drawing each hook backward until they interlap, as shown in Fig. 2 of the drawings, and moving the ring B up on the inside of the studs, the grapple is set.

The bait is secured to the ring B and rests in the space between the hooks and the ring, so that as soon as the fish seizes the bait he pulls the ring away from the projections $a^2$, when the hooks pass across each other and assume the position shown in Fig. 3 of the drawings. This secures the fish so that it is impossible to escape.

Having thus described all that is necessary to a full understanding of my invention, what I claim as new, and desire to protect by Letters Patent, is—

In double spring-hooks formed of one piece of wire, the bait-ring B, combined with downward projections $a^2$ $a^2$, one arranged on the back of each hook, to hold said ring, as shown and described.

In testimony whereof I affix my signature in presence of two witnesses.

CHARLES D. LOCKHEAD.

Witnesses:
EDWARD H. TOWNSEND,
ROBERT LOCKHEAD.